Feb. 15, 1944.  E. SALANI  2,341,658
PROJECTOR
Filed March 4, 1942   2 Sheets-Sheet 1
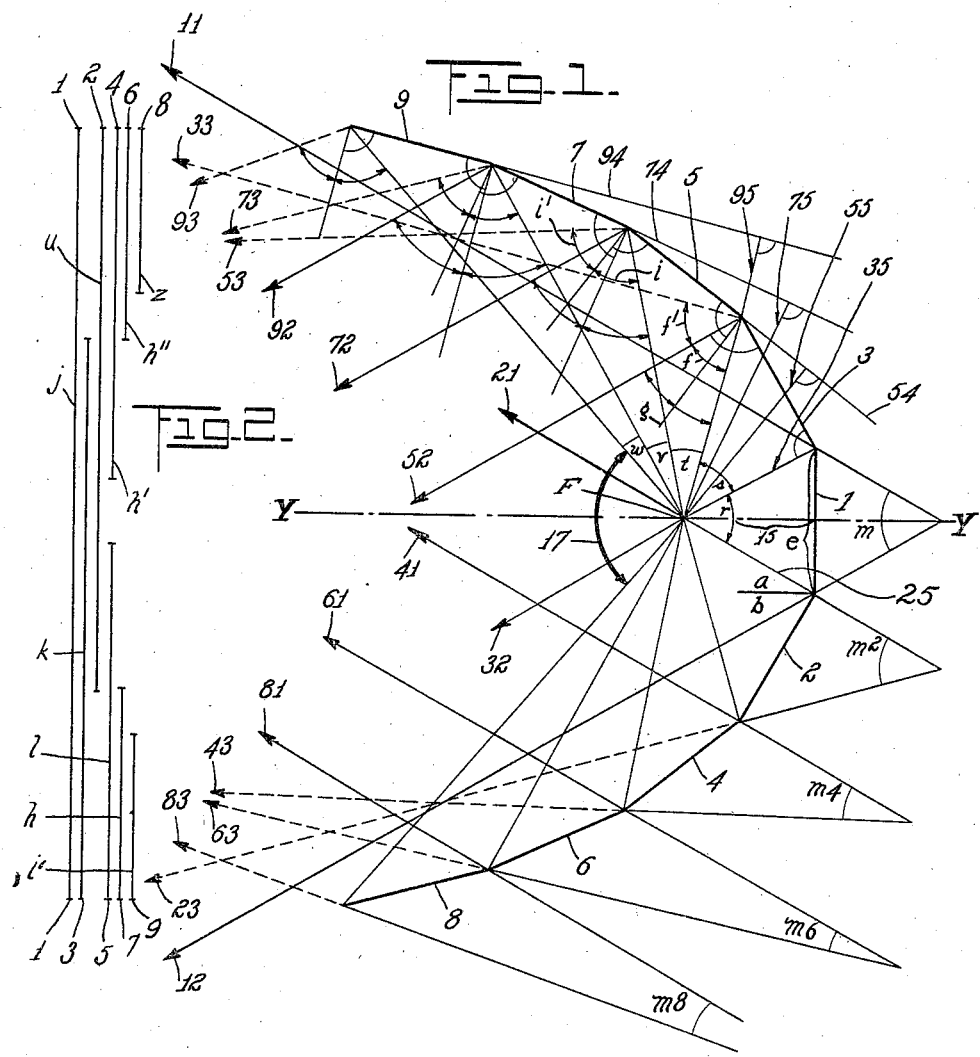
INVENTOR
Ettore Salani,
BY Wallace Peter Groff
ATTORNEYS.

Feb. 15, 1944.   E. SALANI   2,341,658
PROJECTOR
Filed March 4, 1942   2 Sheets-Sheet 2
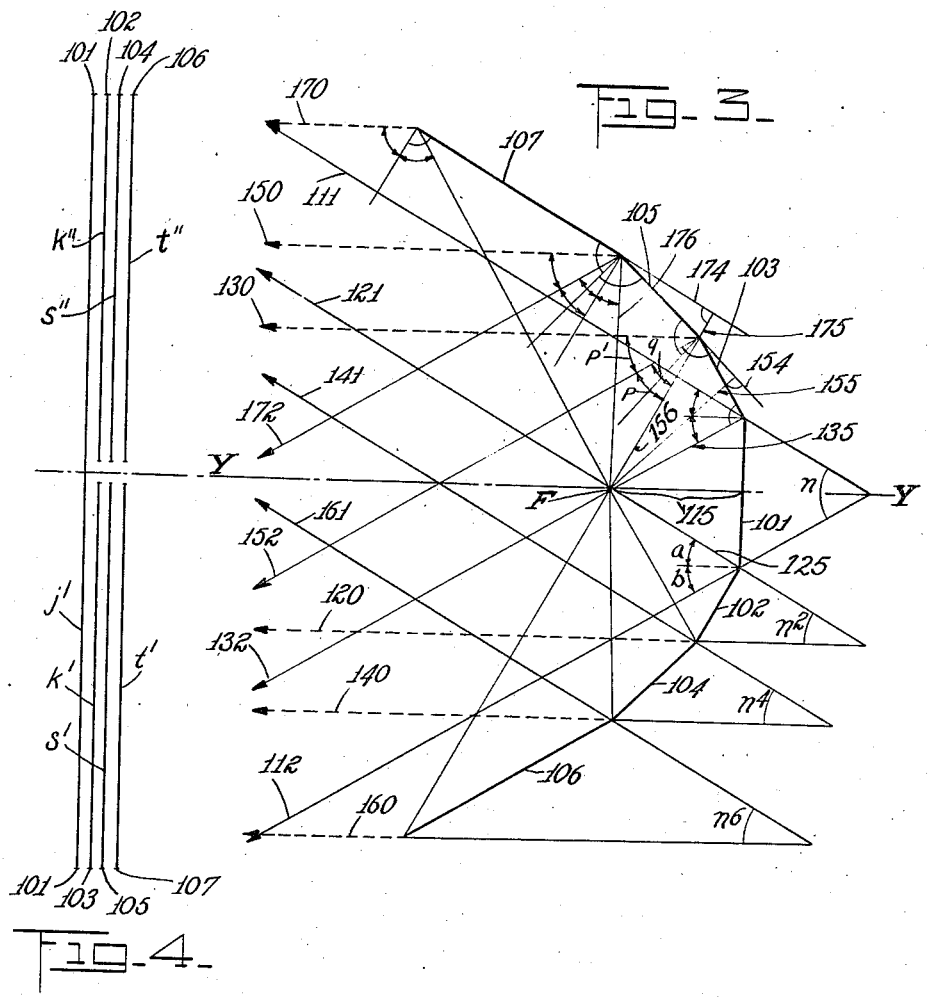
INVENTOR
Ettore Salani,
BY Wilkinson, Huxley & Groff
ATTORNEYS.

Patented Feb. 15, 1944

2,341,658

UNITED STATES PATENT OFFICE 2,341,658

PROJECTOR

Ettore Salani, Rome, Italy; vested in the Alien Property Custodian

Application March 4, 1942, Serial No. 433,386

1 Claim. (Cl. 240—41.36)

When a projector is required for a special purpose, for example for illuminating a building, or an extended area, such as a landing field for aircraft, it is necessary to adapt it very exactly to the purpose in view so as to obtain the desired effect, in the first case by producing different luminous intensities on particular parts of the building such as the ends, according to their nature, and in the second case so as to obtain a uniform distribution of the light over the whole of the illuminated surface.

For the purpose of obtaining this result it has hitherto been usual to employ separately or in groups projectors with parabolic reflectors having a curvature which more or less concentrates the reflected rays or even projectors of any suitable shape which are combined with refracting elements located in the path of the projected beam. The effect obtained by these means is either the formation of a more or less open cone occasionally approaching the shape of a cylinder, or the diffusion in the form of a fan in a single plane. In any case, with these means it has not been possible to adapt the projected light with sufficient precision to the nature of the object to be illuminated, and especially, when using refracting elements, the cost of production is excessive for the purpose in view. On the other hand, known projectors, as a rule require the employment of very strong luminous sources consuming much power for obtaining the desired effect.

The present invention concerns a projector for eliminating the disadvantages referred to. It comprises a single luminous source and is composed of a plurality of similar reflecting elements which are juxtaposed and are constituted by portions of bodies of general cylindrical shape, as parabolic cylinders, the dimensions of each element and its position relatively to the adjacent elements being determined by the luminous intensity desired in the different portions of the projected luminous beam, which intensity is obtained by superposition in the same zone of rays reflected by a plurality of elements.

An object of my invention is to provide selective intense illumination of extended facades and large public structures.

Another object of my invention is to provide a plural reflected beam illumination system wherein beams reflected from one side of the system cross beams reflected from the other side of the system, before incidence on the illuminated structure.

A further object of my invention is to provide a projector system utilizing a single light source and a single supply line for electric power.

Still another object of my invention is to provide a projector system wherein substantially all of the light flux is directed upon the portions of the structure which it is desired to illuminate, and which consumes a minimum amount of electric power for a given amount of desired illumination.

A still further object of my invention is to provide a projector system using metal reflecting elements cut into flat substantially rectangular strips and formed into individual desired shapes.

My invention will be better understood by reference to the following specification and accompanying drawings, wherein:

Fig. 1 shows in transverse horizontal section the arrangement to form a single projector of nine reflecting elements, and the respective boundaries of the individual reflected beams, wherein the beams reflected from elements on one side of the central axis of the system cross the beams reflected from elements on the other side thereof.

Fig. 2 shows for the arrangement of Fig. 1 the superposition pattern of the individual reflected beams as incident on the illuminated structure.

Fig. 3 shows in transverse horizontal section a modification of the arrangement of Fig. 1, wherein the beam reflected from each element has its outer boundary parallel to the central axis of symmetry of the system.

Fig. 4 shows the beam superposition pattern for the reflector disclosed in Fig. 3.

My invention provides for the delineation and clear illumination in an attractive manner of elongated structures and large public buildings.

Referring to the drawings, Fig. 1 shows an arrangement wherein the lateral reflecting elements which are placed on the left side, for example, of the central reflecting element, project their reflected beams into the right portion of the composite projected beam, and correspondingly, the lateral reflecting elements on the right project their reflected beams into the left portion of the reflected beam. From Fig. 1 it will be seen that the beams reflected by the lateral elements on one side cross the beams reflected by the lateral elements on the other side. The relative positions of the different reflecting elements of the projector may also be selected in such a manner that the rays reflected by the inner edges of the lateral reflecting elements located on one side of the central reflecting element are parallel to the outer ray projected by the outer edge of the other side of the central reflecting unit. Consequently, the rays projected by the inner edges of the left lateral reflecting elements are parallel to the ray reflected by the right outer edge of the central reflecting element, while the rays reflected by the inner edges of the lateral reflecting elements on the right are parallel to the outer ray reflected by the left outer edge of the central reflecting element. The width of the elements in this case is preferably so selected that the angles $m_2$, $m_4$, $m_6$, $m_8$, between the rays reflected by their inner edges and the rays reflected by their outer edges, is smaller than the angle $m$ between the extreme rays reflected by the outer edges of the central reflecting element.

By the provision of the reflecting elements as above described, projectors are obtained whose opening is smaller for large values of the inclination of the lateral reflecting element relatively to the central reflecting element, and the reflector 17 (Fig. 1) which may be placed in front of the luminous source F may then embrace an angle less than 180°, for example 120°, which is more advantageous, especially as regards the cooling of the apparatus.

In the form of the invention shown in Fig. 1, the projector consists of a central element 1, four lateral reflecting elements 3, 5, 7, 9, provided on the right side of the plane of symmetry Y—Y passing perpendicularly through the central point of central reflecting element 1, that is, perpendicular to the plane of the drawing, and four outer lateral reflecting elements 2, 4, 6, 8, provided on the left side of the plane of symmetry Y—Y.

All of these reflecting elements have the same width $e$ and further have the same height. These reflecting elements are of substantially rectangular shape, that is, when they are developed and placed flat on a plane, each reflecting element has substantially rectangular shape, which permits of easily cutting out or stamping the individual reflecting elements as metal sheets. Before mounting in the reflector, the elements are formed to be curved concavely in a single direction lengthwise of the element, according to a curve which is a conic section, such as an ellipse, parabola, or hyperbola, the apex or vertex of which curve is located in the transverse plane of symmetry of the system, that is, the plane of the drawing.

The trace of each element on this transverse plane of symmetry or plane of the drawing is a straight line. These traces of adjacent elements form a continuous chain.

A parabolic longitudinal curvature of the element is selected if a thin or narrow reflected beam of small spread is desired, and an elliptic or hyperbolic curvature is selected when a wide angle beam is desired. All of the reflecting elements of a given projector have a longitudinal curvature of the same type, such as all being parabolic, or all being elliptical. The focal distance of the curve according to which a given element is to be curved concavely is determined separately for each element. Two individual reflecting elements which are symmetrically placed relatively to the central plane of symmetry Y—Y, have the same focal distance.

Since the vertex of the conic section curve according to which a given reflecting element is curved concavely is located in the transverse plane of symmetry, that is the plane of the drawing, the focal distance of said curve is given by the focal distance of the reflecting element itself, that is by the distance separating the source from a plane perpendicular to said transverse plane of symmetry, and passing through the trace of the considered reflected element upon said transverse plane of symmetry. Therefore this focal distance for a given reflecting element is represented by the length of the projected perpendicular from the source on the extended transverse trace of a given reflecting element on the plane of the drawing.

Thus, for example, the focal distance of lateral reflecting element 9 is the length of the line 95, which is the perpendicular dropped from source F on the extension 94 of element 9, and this element 9 is curved concavely according to the conic section curve which has this focal distance shown as the length 95.

It follows that the transverse sections of each of the various reflecting elements, taken on any plane parallel to the plane of the drawing, are straight lines.

In constructing the apparatus there is first selected the width $e$ which is the same for all the reflecting elements of the arrangement shown in Fig. 1, and then only the angular positions of the reflecting elements relative to the central reflecting element remain to be determined. This angular position is graphically successively determined for each element by making the angle of reflection equal to the angle of incidence for the rays incident on the edge of each element.

The various reflecting elements are each placed on a movable support. Each support is mounted on a frame, and its position is adjusted at the factory. If necessary, the geometrical position of each element may be changed to a certain extent, so as to obtain a slightly different light distribution.

There may be first determined the focal distance 15 of the central reflecting element 1 so that its extreme edges send the outer rays 11 and 12 back in the desired directions. The focal point F and focal distance 15 are determined if spread angle $m$ between extreme rays 11 and 12, and the width $e$ has been selected, since with reference to the perpendicular erected at the end of central element 1, angle of incidence $a$ must equal angle of reflection $b$. In Fig. 1, a spread angle of 60° between the ray paths 11 and 12 has been selected. This spread angle $m$ cannot be so wide that its outer rays intercept the outermost lateral reflectors. This spread angle $m$ gives one of the dimensions of the beam, thus, it is determined by one of the dimensions of the surface to be illuminated, and by this distance at which the projector is placed therefrom.

If the spread angle $m$ is first selected, there are then drawn the outer rays 11 and 12 reflected by the extreme outer edges of central reflecting element 1.

Lateral reflecting element 3 is then placed at such an angle that the inner reflected ray 32, which is reflected by its inner edge, will be parallel to the extreme ray 12 reflected by the extreme left edge of central element 1. It will be found that for a spread angle $m$ of 60°, which is convenient, this element 3 must be placed perpendicularly relative to this ray 32. Thereupon the selected width $e$ of the reflecting element is laid off. There is then constructed the ray 33 reflected by the outer edge of element 3, and for this purpose the perpendicular is erected on the extreme end of element 3, and the angle of reflection $f'$ is made equal to the angle of incidence $f$, which determines the direction of this extreme ray 33. Inasmuch as reflecting element 3 is perpendicular to beam 32, the perpendicular constructed on the extreme outer end of element 3 is parallel to beam 32, and therefore coincides with ray 52 which is reflected by the inner edge of reflecting element 5. The reflecting element 5 must therefore be perpendicular to the bisector $g$ of the angle of incidence $f$. The width $e$ is then laid off and the perpendicular is erected on its extreme end, and the angle of reflection $i'$ is made equal to the angle of incidence $i$, in order to obtain the direction of the extreme ray 53 reflected by the outer edge of element 5. Then extreme inner ray 72 is drawn parallel to ray 52, and reflecting element 7 is laid off perpendicular to the bisector of the angle of incidence $i$.

The same construction is repeated for each reflecting element. The number of reflecting elements is limited by the spread between rays 11 and 12, which are the extreme rays reflected by the central reflecting element. These extreme rays 11 and 12 must be permitted to radiate freely, and must not be intercepted by any part of the outermost lateral reflecting elements.

Fig. 2 shows diagrammatically the superposition of the individual beams reflected by the different individual reflecting elements, on an extended surface illuminated by the projector, as would exist at a considerable distance.

Assuming that the beam of the central element 1 illuminates a surface of a width $j$ corresponding to the spread angle $m$ between the outer rays 11 and 12, reflected by this central element 1, then it will be seen from Fig. 1 that on opposite sides of the central plane of symmetry of area $j$, the lateral reflecting elements 2, 4, 6, 8, superpose their reflected beams on areas $u$, $h'$, $h''$ and $z$ and the lateral reflecting elements 3, 5, 7, 9, on the areas $k$, $l$, $h$, $i''$, each corresponding with the angle between the inner and outer rays reflected by these elements respectively.

It will be seen that by means of the projector which I provide it is possible to employ five reflecting elements to illuminate the outer end of the structure to be illuminated, whereas the intermediate parts of the structure are illuminated by only four elements, and the exact center by only three reflecting elements.

It follows that if the illumination produced on the center of the illuminated surface is equal to 3 units, the illumination of the extreme ends of the surface is equal to 5 units, inasmuch as the spread angles of the light fluxes $r$, $s$, $t$, $v$, $w$, incident upon reflecting elements 1, 2, 5, 7, 9, are approximately proportional to the widths $j$, $k$, $l$, $h$, $i''$, of the surface illuminated by each of them, and all of the reflecting elements are of the same length and illuminate a surface of equal height.

This type of projector shown in Fig. 1 is particularly adaptable for illuminating buildings presenting complicated and intricate architectural designs, for which it is necessary generally to throw more light on the extreme ends of the structure, in order to give the whole a better relief.

For certain purposes it is preferable to use a modified form of my invention as shown in Fig. 3, wherein the central reflecting element 101 illuminates the entire surface to be illuminated, while the beam projected by each lateral reflecting element extends only over one-half of the surface to be illuminated. This projector gives even illumination of the entire surface, and is preferably employed to illuminate buildings embodying modern architectural styles of simple lines.

Such a projector is shown in transverse section in Figure 3. The extreme inner rays 132, 152, 172, and 121, 141, 161, are made respectively parallel to the extreme outer rays 111 and 112 reflected by the outer edges of central reflecting element 101. The extreme outer rays 130, 150, 170, and 120, 140, 160, reflected by the outer edges of the lateral reflecting elements, are all made parallel to the central plane of symmetry Y—Y passing through the central point of central element 101 perpendicularly thereto and perpendicularly to the plane of the drawing. These two conditions being laid down, the widths of the individual reflecting elements on a given side of the central reflecting element in general will not be the same and must be determined graphically as determined by the condition that the angle of reflection equals the angle of incidence.

For the arrangement of Fig. 3, the angular position of lateral reflecting element 103 is determined in a manner similar to what has been explained above for Fig. 1. The spread angle $n$ between extreme rays 111 and 112 reflected by the edges of central element 101 is again desirably selected as 60°, and element 103 is therefore perpendicular to ray 132 which is the extreme ray reflected by the inner edge of element 103 and which is parallel to ray 112. The outer edge of element 103 reflects an extreme ray 130 which is parallel to the plane of symmetry Y—Y passing through central element 101. In this arrangement shown in Fig. 3, it is not ordinarily possible to have all of the reflecting elements of the same width, as in the arrangement of Fig. 1. The width of the lateral reflecting element 103 is determined by the intersection of the line giving the angular position of element 103, which is perpendicular to ray 132, with the incident ray 156 coming from the source F, which is reflected according to outer ray 130 parallel to the plane of symmetry Y—Y. The direction of said ray 156 coming from the source F is found by making angle of reflection $p'$ formed by outer ray 130 with the perpendicular to element 105 equal to the angle of incidence $p$ formed by said perpendicular with said ray 156 coming from the source.

Then the extreme inner ray 152 is drawn which is reflected by the inner edge of element 105, parallel to rays 132 and 112. The normal to the bisector of the angle $q$ between the line of the ray 156 from source F, and inner extreme ray 152, gives the angular position of the reflecting element 105. The width of this lateral reflecting element 105 is determined in the same manner as the width of lateral reflecting element 103. The same procedure is successively followed for each element, it being understood that the lateral reflecting elements 102, 104, 106, and 103, 105, 107, provided symmetrically relatively to the plane of symmetry Y—Y, are necessarily and respectively of the same length or height, and in the corresponding angular positions.

Fig. 4 shows a diagram of the superposition of the beams of the different elements on a surface illuminated by the projector. Assuming that the beam of the central element 101 illuminates a surface of a width $j'$ corresponding to the angle $n$ between the outer rays reflected by this element, then it will be seen from Fig. 3 that on opposite sides of the central plane of the surface $j'$, the elements 103, 105, 107 superpose their reflected beams on surfaces $k'$, $s'$, and $t'$ and the elements 102, 104 and 106 on the surfaces $k''$, $s''$ and $t''$ each corresponding with the angle between the outer and inner rays reflected by these elements, The lateral reflecting elements of Fig. 3 are concavely curved in a single direction longitudinally, as described for the embodiment of Fig. 1, according to conic section curves, whose focal distance is determined in the same manner.

In my Patent No. 2,255,819, I have shown in Fig. 7 thereof a reflecting system for illuminating elongated structures, but the structure therein described is decidedly more cumbersome and produces less illuminating efficiency than the arrangement which I have here shown in Fig. 3. In the arrangement here shown, because of the fact that the ray reflected from one side crosses the plane of symmetry to the other side, the lateral reflecting elements are inclined to a larger degree, with the result that the dimensions of the projector are much smaller, and that a smaller number of reflecting elements is required, notwithstanding which a larger spread angle of light flux is produced, which produces a better utilization of the light source.

The construction of the reflecting systems according to the above description presents considerable advantages, because, by selecting the dimensions, orientation, and curvature, of the elements properly, beams are obtained which are of rectangular or square cross section and have well defined clearly marked boundaries. Thus, by means of such a projector it is possible to illuminate objects or structures in the middle of a city by adjusting or setting the limits of the reflected light beam in such a manner that only the object desired is illuminated, whereas immediately adjoining objects remain in deep shadow or darkness.

An application of the principle and apparatus which has been here described has been made in illuminating a tower in the middle of a river. For many years, the city of Lucerne, Switzerland, sought to illuminate this tower, but there did not exist any apparatus which could satisfactorily accomplish the desired result, because the apparatus which it was attempted to use produced a seriously dazzling effect on the guests in hotels along the river banks. It was only after the projectors herein described were employed, that it was found possible to intensely illuminate the tower in the desired manner, and at the same time leave the buildings which stand along the river bank in deep shadow or in darkness.

In employing the invention which I have described, it will be understood that depending on the size of the object or structure to be illuminated, optical elements and systems of suitable characteristics and dimensions are constructed. For example, the spread angle $m$ between extreme rays 11 and 12 reflected from the edge of the central reflecting elements, instead of being 60°, may be 15°, 30°, 40°, etc. Moreover, the height of the object or structure to be illuminated determines the spread angle $\alpha$ of the beam in the other direction, perpendicular to the plane of the drawing. For a very low object, elements curved according to a parabola are employed. If the object is somewhat higher, it may be found preferable to employ elements which curve according to an ellipse. The geometrical constants or parameters of this ellipse are determined by the height of the reflecting element, which height is the same for all the reflecting elements and which is arbitrarily chosen, and is further determined by the spread angle $\alpha$ of the beam which is required by the height of the object to be illuminated and by the respective focal distances of each element.

According to the present invention, all elements are of the same height and of substantially rectangular shape, resulting in minimum waste of the raw material for constructing the reflecting elements, and they are juxtaposed beside each other. But since each reflecting element is curved concavely along the direction of its length according to a curve having as its focal distance the focal distance of the reflecting element considered relatively to the source, and since the focal distance increases with larger values of the spacing of the lateral reflecting elements from the central reflecting element, it follows that the ends of the inner edges of an outwardly positioned lateral element overlie the ends of the outer edges of a lateral reflecting element lying adjacent on the side toward the central reflecting element. Thus, even after the projector has been assembled, the adjusting of each individual lateral reflecting element can still be changed to a certain extent to suit conditions and requirements.

The projector which I have described radiates a beam whose transverse section is of substantially rectangular shape, and the boundary of the illuminated field has rigorously straight lines on all four sides. In this way, it permits solution of the problem of illuminating objects, such as monuments, located in the middle of a city.

It will be obvious that I have provided an illuminating and reflecting system which is simple and inexpensive in construction, and efficient and convenient in use.

To those who are skilled in the art, it will be apparent after following the present description of my invention, that modifications thereof employing the principles which I have described may be made to meet particular conditions, and all such modifications which are comprehended within the scope of the appended claim are considered to be a part of my invention.

I claim:

In a reflector of the type providing an illuminated field made up of superimposed light beams and having a plane of symmetry with a point source of light situated in said plane, the reflector comprising a central reflecting element about which is mounted a plurality of relatively long and narrow auxiliary reflecting elements of substantially equal length with each of the auxiliary elements formed as a part of an approximately cylindrical surface generated by translating a conic section of the same kind, said central reflecting element mounted symmetrically with reference to said plane of symmetry and having a wide angle of reflection bounded by limiting rays which diverge from its outer edges outwardly and symmetrically with reference to said plane of symmetry and substantially define said field, said auxiliary elements comprising a plurality of pairs of lateral reflecting elements mounted respectively symmetrically with respect to said plane of symmetry and symmetrically to the reference plane passing through said point source of light normal to said central element, said pairs of auxiliary elements forming optically a substantially continuous surface with said central reflecting element, each said auxiliary element being of a width and positioned with respect to said plane of symmetry to deliver a beam of light bounded on a first side by an inner ray which extends from the inner edge of said auxiliary element substantially parallel to said limiting ray reflected from the outer edge of said central element on the opposite side of said plane of symmetry from that of said auxiliary element and by an outer ray which extends substantially parallel to said plane of symmetry from the second side of each auxiliary element, the traces of all of said elements on said reference plane constituting a series of joined straight lines with the traces of the respective pairs of auxiliary elements being of different lengths, different pairs of the auxiliary elements having different focal lengths and all of said auxiliary elements being located with respect to said plane of symmetry to have a common focal point in said light source.

ETTORE SALANI.